United States Patent [19]

Hovey

[11] Patent Number: 4,583,499
[45] Date of Patent: Apr. 22, 1986

[54] IN-LINE THERMOSTAT APPARATUS FOR AUTOMOTIVE VEHICLES

[76] Inventor: Stanton L. Hovey, 1024 W. 12th Pl., Tempe, Ariz. 85281

[21] Appl. No.: 661,448

[22] Filed: Oct. 16, 1984

Related U.S. Application Data

[63] Continuation-in-part of Ser. No. 548,432, Nov. 3, 1983, abandoned.

[51] Int. Cl.$^4$ .............................................. F01P 7/16
[52] U.S. Cl. .................................. 123/41.1; 236/34.5
[58] Field of Search ............. 123/41.02, 41.08, 41.09, 123/41.1; 236/23, 34, 34.5, 101 R, 101 C

[56] References Cited

U.S. PATENT DOCUMENTS

| | | | |
|---|---|---|---|
| 1,610,433 | 12/1926 | Fletcher | 236/34 |
| 1,791,756 | 2/1931 | Fay | 236/34.5 |
| 1,873,591 | 8/1932 | James | 123/41.1 |
| 2,118,518 | 5/1938 | Hromadka | 123/41.1 |
| 2,174,042 | 9/1939 | Rose | 236/34.5 |
| 2,278,421 | 4/1942 | Brown | 236/34 |
| 4,195,777 | 4/1980 | Ikebukuro et al. | 123/41.1 |
| 4,327,673 | 5/1982 | Schroeder | 123/41.08 |

FOREIGN PATENT DOCUMENTS 500660 2/1939 United Kingdom ............. 123/41.08

Primary Examiner—William A. Cuchlinski, Jr.
Attorney, Agent, or Firm—H. Gordon Shields

[57] ABSTRACT

Thermostat apparatus is designed for simple and rapid in-line installation in a radiator hose between an internal combustion engine block and a radiator. A substantially constant diameter cylindrical housing and a thermostatic element disposed in the housing define a unitary thermostat apparatus. The radiator hose is secured by appropriate hose clamp elements to opposite ends of the cylindrical housing.

4 Claims, 13 Drawing Figures

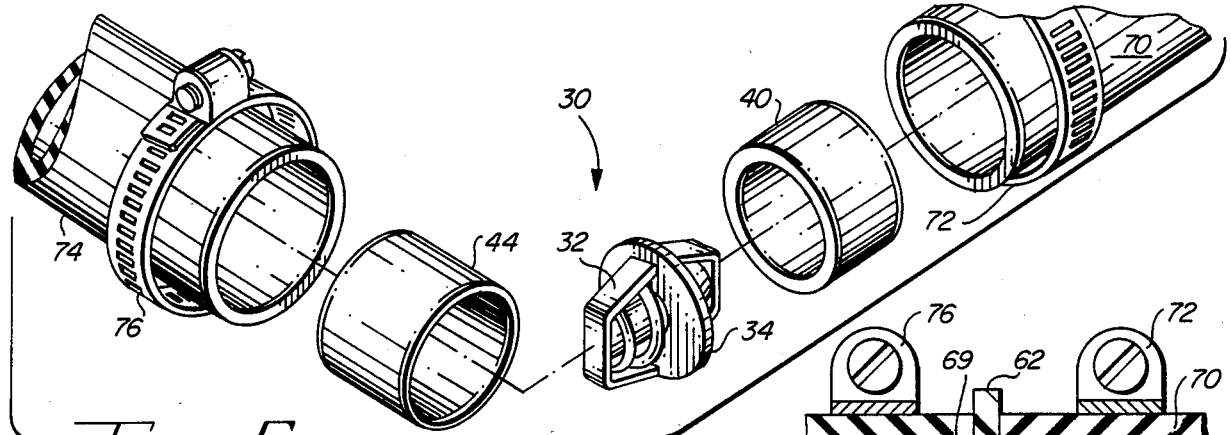
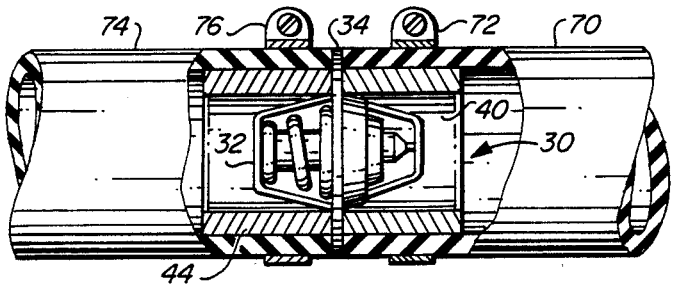
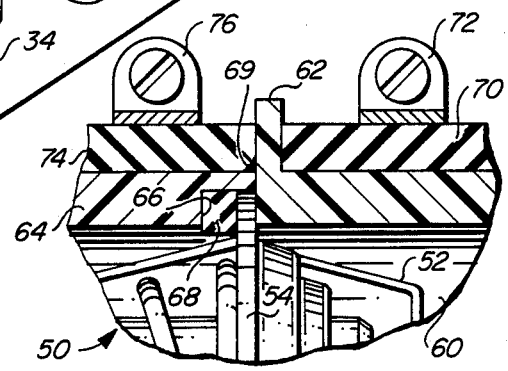
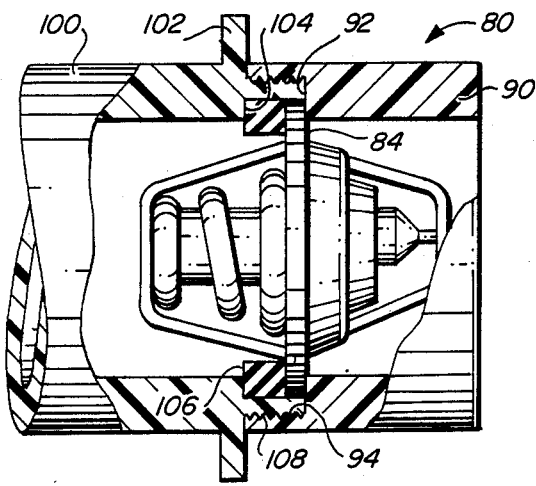
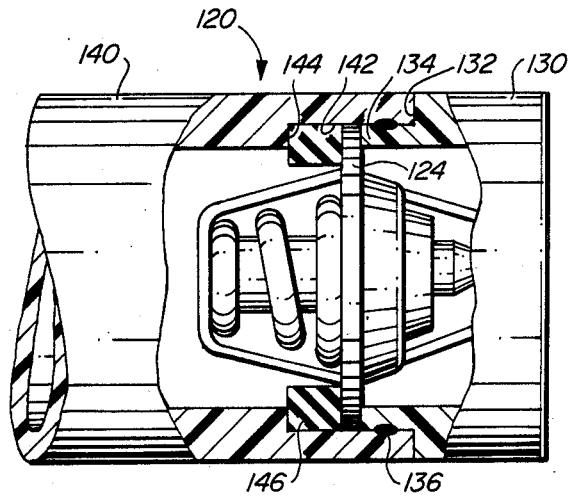
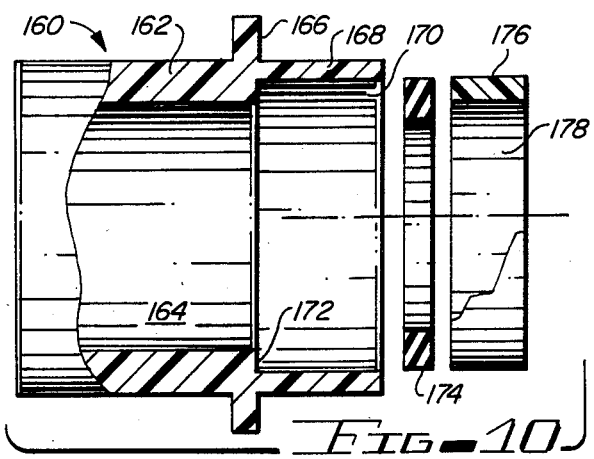
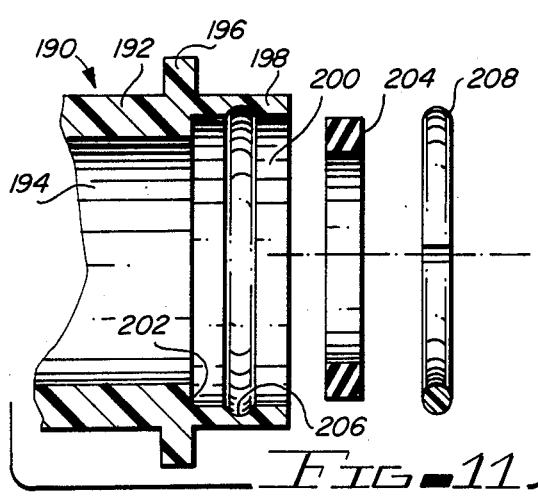

IN-LINE THERMOSTAT APPARATUS FOR AUTOMOTIVE VEHICLES

CROSS-REFERENCE TO RELATED APPLICATION

This application is a continuation-in-part application of copending application Ser. No. 548,432, filed Nov. 3, 1983, now abandoned.

BACKGROUND OF THE INVENTION

1. Field of the Invention

This invention relates to thermostats, and, more particularly, to thermostats for automotive vehicles which are disposed between an automotive engine and a radiator.

2. Description of the Prior Art

The placement of an engine coolant thermostat or a related thermostat between an engine block and a radiator is generally old in the art. Examples of such placement are shown in various U.S. patents, such as U.S. Pat. Nos. 1,328,855, 1,565,284, 1,610,434, 1,651,828, 1,677,103, 1,791,756, 1,962,134, which incidentally, schematically discloses a dual temperature cooling system, U.S. Pat. Nos. 1,992,789, 3,851,629, 4,195,777, and 4,327,673.

In the '673 patent, the thermostat is disposed in a housing in the lower radiator hose. The housing is separate so that the thermostatic element may be removed from the housing. The housing in the '756 patent also appears to be separable.

In contemporary automotive vehicles, the thermostats are generally placed in a housing at the top of the engine block. However, many of the thermostats thus placed are difficult to change due to the complexity of engines and engine accessories in the vehicles. The routings of hoses and the placement of various elements, particularly elements dealing with smog elimination, often make it rather difficult to change a thermostat. The utilization of an integral, in-line thermostat and housing in the radiator hose solves the inherent thermostat housing access problem.

SUMMARY OF THE INVENTION

The invention described and claimed herein comprises an integral cylindrical element in which is disposed a thermostat, with the unitary cylinder and thermostat adapted to be disposed in line in a radiator hose between the engine block and a radiator, and designed for simple and rapid thermostat replacement.

Among the objects of the present invention are the following:

To provide new and useful thermostat apparatus for an automotive vehicle;

To provide new and useful in-line thermostat apparatus disposed between an engine block and a radiator;

To provide new and useful unitary thermostat apparatus which includes a thermostat in an integral cylindrical housing;

To provide new and useful thermostat apparatus having a stepped exterior for receiving connecting hoses;

To provide new and useful in-line thermostat apparatus having a replaceable thermostat;

To provide new and useful disposable thermostat apparatus having a thermostat element in an integral housing;

To provide new and useful thermostat apparatus in which a thermostat is disposed within a cylindrical housing and the housing is adapted to be secured to a radiator hose between an engine block and a radiator; and To provide thermostat apparatus which may be simply and rapidly installed.

BRIEF DESCRIPTION OF THE DRAWING

FIG. 5 is an exploded perspective view of the apparatus of FIGS. 3 and 4 in a use environment.

FIG. 6 is a side view of the assembled apparatus of FIG. 5, with a portion in partial section.

FIG. 7 is an enlarged view in partial section of a portion of an alternate embodiment of the present invention.

FIG. 8 is a side view in partial section of another alternate embodiment of the apparatus of the present invention.

FIG. 9 is a side view in partial section of another alternate embodiment of the apparatus of the present invention.

FIG. 10 is a side view in partial section of a portion of another alternate embodiment of the apparatus of the present invention.

FIG. 11 is a side view in partial section of a portion of another alternate embodiment of the apparatus of the present invention.

DESCRIPTION OF THE PREFERRED EMBODIMENT

Figure 1:
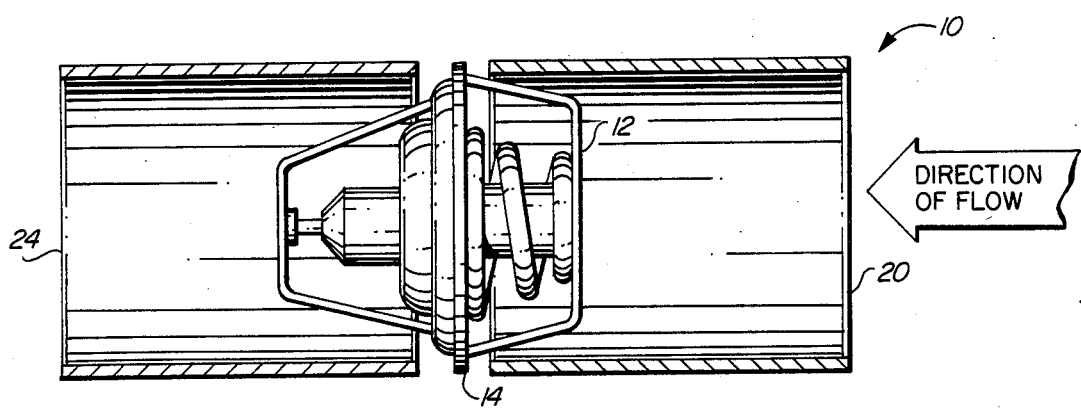
FIG. 1 is a side view in partial section of the elements comprising the apparatus of the present invention before assembly.
Figure 2:
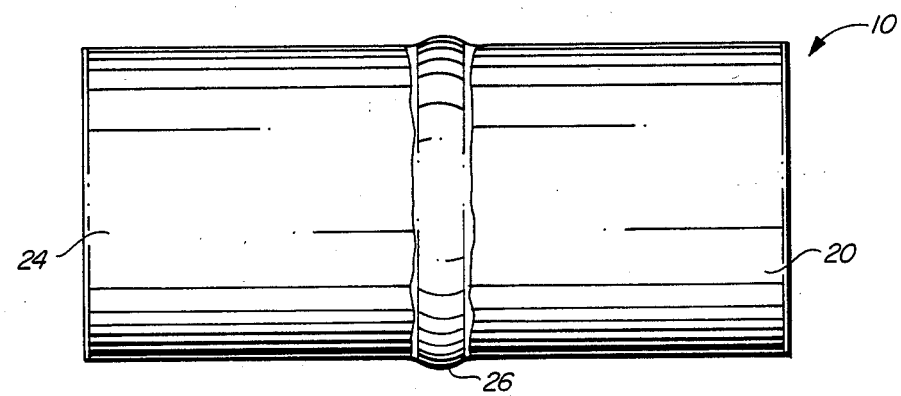
FIG. 2 is a side view of the assembled apparatus of FIG. 1.

FIG. 1 is a side view in partial section of thermostat apparatus 10 embodying the present invention. The apparatus 10 includes a thermostat 12 disposed between a pair of cylindrical tubes 20 and 24. The apparatus 10 in FIG. 1 is in its unassembled condition. In FIG. 2, the thermostat 12 and the cylindrical tubes 20 and 24 are shown secured together. For the following discussion, reference will be made to FIGS. 1 and 2.

The thermostat 12 is of a typical or conventional design used generally for automotive applications. It includes an outwardly extending flange 14 disposed between the upper and lower portions of the thermostat.

The cylindrical tubes 20 and 24 are preferably made of steel or other appropriate material. They are shown, in FIG. 1, as having the same general overall diameter as the diameter of the thermostat flange 14. Accordingly, when the two steel tubes 20 and 24 are assembled to the thermostat 12, the resulting thermostat apparatus 10 defines a generally elongated cylinder, which may be appropriately butt welded together, as at 26, to provide a single element. The welding together of the tubes 20 and 24, at the outer periphery of the thermostat flange 14, effectively seals the three elements together to define a single element.

The weld 26 in FIG. 2 is exaggerated for illustrative purposes. The exterior periphery is preferably substantially continuous, defining a substantially continuous cylindrical housing, having a substantially constant diameter, for the thermostat 12. The constant diameter of the apparatus 10, which is about the same diameter as the maximum diameter of the thermostat 12, helps to minimize the securing of the apparatus 10 between two connecting radiator hoses. There are thus no bulges, etc., to interfere with the routing of any other hoses, conduits, electrical wires or harnesses, etc.

Figure 3:
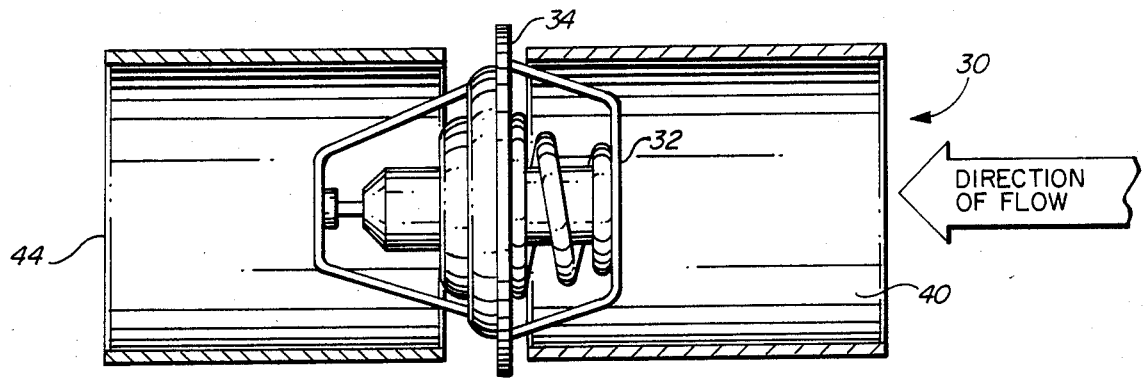
FIG. 3 is a side view in partial section of the elements of the present invention before assembly and comprising an alternate embodiment of FIG. 1.
Figure 4:
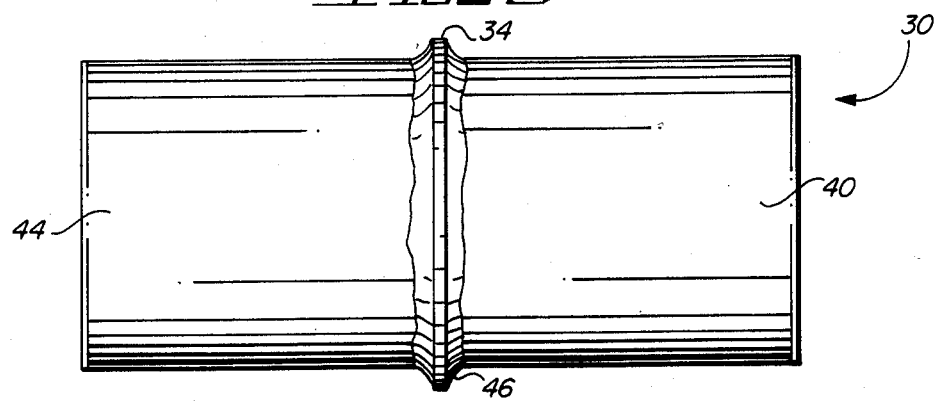
FIG. 4 is a side view of the assembled apparatus of FIG. 3.

FIG. 3 is a view in partial section of three elements which comprise an alternate embodiment of the thermostat apparatus 10 of FIGS. 1 and 2. The thermostat apparatus 30 is shown consisting of three elements, spaced slightly apart from each other before assembly. FIG. 4 is a side view of the thermostat apparatus 30 of FIG. 3 after it is assembled together. FIG. 5 is an exploded perspective view of the thermostat apparatus 30 of FIGS. 3 and 4 in a use environment, including portions of a radiator hose. FIG. 6 is a view in partial section of the assembled apparatus of FIG. 5. For the following discussion, reference will be made generally to FIGS. 3, 4, 5, and 6.

The thermostat apparatus 30 of FIGS. 3-6 is similar to the thermostat apparatus 10 of FIGS. 1 and 2. The thermostat apparatus 30 includes a thermostat 32 which has an outwardly extending flange 34. Included are two cylindrical tube elements 40 and 44, which are substantially identical to the elements 20 and 24 of FIGS. 1 and 2, except that the diameter of the tubular elements may be less than that of the tubular elements 20 and 24 of FIGS. 1 and 2. The flange 34 of the thermostat 32 extends outwardly beyond the outer periphery of the tubes 40 and 44. That is, the diameter of the flange 34 is slightly greater than the overall diameter of the tubular elements 40 and 44.

When the three elements 32, 40, and 44 are secured together, as by welding, as shown in FIG. 4, the outer portion of the flange 34 extends outwardly beyond the outer periphery of the cylindrical or tubular elements 40 and 44. For securing the three elements together, appropriate fillet welding may be used. The fillet welding accordingly welds the tubular elements 40 and 44 to the flange 34 of the thermostat 32 to define a single, unitary thermostat apparatus 30. The diameter of the apparatus 30 is still generally constant, defining a substantially continuous cylindrical housing. The flange 34, outwardly from the cylinder portion or tubular elements 40 and 44 comprises a center stop or stop element for the connecting radiator hoses.

The tubular elements 40 and 44 are preferably made of steel or other appropriate metallic materials, as are the elements 20 and 24 of thermostat apparatus 10.

In FIG. 5, the thermostat apparatus 30 is shown disposed between a pair of radiator hoses or hose portions 70 and 74. FIG. 6 is a side view of the assembled thermostat apparatus 30 and the hoses 70 and 74 secured to the tubular portions 40 and 44, respectively. The hoses or hose portions 70 and 74 are secured to their respective cylindrical or tubular portions of the thermostat apparatus 30 by hose clamps 72 and 76, respectively.

A portion of the assembled apparatus is shown broken away, and in partial section, to illustrate the features of the thermostat apparatus 30 and its relationship to the hoses 70 and 74. The portion of the radially outwardly extending flange 34 of the thermostat 32 that extends beyond the outer periphery of the cylindrical portions acts as a built-in stop for the ends of the hose portions 70 and 74. For convenience in assembling the hose portions 70 and 74 to the thermostat apparatus 30, the hose portions 70 and 74 may abut the outer portion of the flange 34. The hose clamps 72 and 76 are then tightened against their respective radiator hose portions to secure the thermostat apparatus 30 to the radiator hoses. The overall appearance of the hoses 70 and 74, secured to the apparatus 30, is generally continuous, and without a bulge or other enlarged diameter fixture at the juncture of the two hoses.

In FIGS. 1-6, thermostatic elements are shown assembled to steel or metal tubular elements, with the tubular elements appropriately secured, as by welding, to the outwardly extending flanges or rims of thermostatic elements. In the embodiments of FIGS. 7-13, plastic or other, similar, non-metallic material is used.

In FIG. 7, plastic or similar material is shown. Thermostatic apparatus 50 includes a thermostat 52 disposed between a pair of tubular elements 60 and 64. The thermostat apparatus 50 includes a thermostat 52 disposed between a pair of tubular elements 60 and 64. The thermostat 52 includes a radially outwardly extending flange 54. The tubular element 60 includes a radially outwardly extending flange 62 at one end. The flange 62 is adapted to be disposed against the radially outwardly extending flange 54 of the thermostat 50 during assembly.

The tubular element 64 includes a counterbore 66. The counterbore 66 is essentially an inner groove or channel which receives a sealing element or gasket 68. The sealing element or gasket 68 is disposed on the shoulder of the counterbore or channel 66, and the flange 54 of the thermostat 52 is disposed against the sealing element 68. The cylindrical element 60 is then disposed against the flange 54 and against the end of the tubular element 64. The two tubular elements 60 and 64 are then appropriately secured together by appropriate plastic welding processes, which may include a bead 69.

It will be noted that the tubular elements 60 and 64 may also be metal, if desired, and the same components and structural arrangement may be used. As an alternative to the metal, the plastic elements, as discussed, may be used.

The radially outwardly extending flange 62 of the cylindrical element 60 comprises an outwardly extending flange of the assembled thermostatic apparatus 50, similar to the radially outwardly extending flange 34 of the assembled thermostatic apparatus 30 of FIG. 6.

For assembly into an automotive or similar application, the thermostatic apparatus 50 is disposed between the pair of radiator hose portions 70 and 74. The hose portions extend over the outer peripheries of the cylindrical elements 60 and 64 and abut against the outwardly extending flange 62. The hose portions 70 and 74 are then appropriately secured to the thermostat apparatus 50 by means of the hose clamps 72 and 76. The hose clamps 72 and 76 are well known and understood in the art.

The outwardly extending flange 62 provides a convenient stop for the hoses 70 and 74. In the alternative, and as illustrated in FIGS. 2 and 9, an outwardly extending flange may be eliminated, thus providing a relatively smooth, continuous outer periphery for the thermostat apparatus. In FIG. 7, the flange 62 is shown extending radially outwardly beyond the outer periphery diameter of the hoses 70 and 74. This exaggeration is for illustrative purposes only to illustrate that the flange 62 acts as a very positive stop element. For practical considerations, the flange 62 preferably is about the same diameter at the outer diameter as the hoses 60 and 70. This provides a substantially continuous exterior from hose to hose, or from block to radiator. The thermostat apparatus 50 is thus substantially a continuous cylinder.

For securing the plastic cylindrical or tubular portions of the thermostat apparatus 50 together, appropriate methods may be used, such as solvent welding, rf welding, etc.

FIG. 8 comprises another alternate embodiment of the thermostat apparatus discussed above. Thermostat apparatus 80 is shown in a side view in partial section. The thermostat apparatus 80 includes a thermostat element 82 disposed between a pair of cylindrical elements 90 and 100.

The thermostat element 82 includes a radially outwardly extending flange 84. The thermostat element 82 is substantially identical to the thermostat element 52, as discussed above in conjunction with FIG. 7, and both of which are substantially identical to the thermostat elements 12 and 32, as discussed above in conjunction with FIGS. 1, 2, and 3–6.

The cylindrical tube 90 includes a counterbore at one end. The counterbore includes a radially extending shoulder 92 and an axially extending internally threaded portion 94.

The cylindrical tube element 100 includes a radially outwardly extending flange 102 and a counterbore. The counterbore includes a radially extending shoulder 104. A sealing element or gasket 106 is shown disposed within the counterbore and against the shoulder 104 of the counterbore.

Extending longitudinally on the outer periphery of the end of the tubular element 100 is a relatively short cylindrical portion substantially coextensive with the counterbore. The outer periphery of the short cylindrical portion includes external threads 108. The external threads 108 extend into the internal threads 94 of the tubular element 90. Using the threaded connection, the thermostat 82 may be replaced in the cylindrical housing portions 90 and 100.

With the sealing element 106 disposed against the counterbore shoulder 104, the thermostat element 82 is disposed within the bore of the tubular or cylindrical element 100. The radially outwardly extending flange 84 of the thermostat element 82 is disposed against the sealing element 106. The cylindrical element or tube 90 is then threadedly secured to the element 100. The shoulder 92 of the tube 90 is disposed against the flange 84 to hold the thermostat 82 against the sealing element 106.

If desired, the cylindrical elements or tubes 90 and 100 may be appropriately secured together, as by welding, as discussed above in conjunction with the apparatus 50 of FIG. 7. Solvent may be added to the threads 94 and 108, or any other appropriate method may also be used to appropriately secure the elements 90 and 100 together to hold the element 82 in place and to define a unitary thermostat apparatus 80. The cylindrical elements 90 and 100, when secured together, comprise a generally continuous cylindrical and unitary thermostat apparatus, with the flange 102 extending radially outwardly a relatively short distance to act as a stop element for the radiator hoses. The flange 102 preferably does not extend radially outwardly beyond the outer diameter of the radiator hoses.

As in the embodiments of FIGS. 3, 4, 5, 6, and 7, the radially outwardly extending flange 102 may comprise a stop element against which hoses may be disposed in the assembly of the thermostat apparatus 80 in a use environment. With radiator hoses (not shown) disposed against the flange 102, the exterior periphery of the hoses is substantially continuous, as shown in FIG. 6.

FIG. 9 is a side view, in partial section, of thermostat apparatus 120. The thermostat apparatus 120 comprises another alternate embodiment of the apparatus of the present invention.

The thermostat apparatus 120 includes a thermostatic element 122 disposed between a pair of cylindrical tube elements 130 and 140. The thermostat element 122 includes a radially outwardly extending flange 124. The thermostat element 122 is substantially identical to the other thermostat elements discussed above in conjunction with the other embodiments in the Figures.

The cylindrical tube or element 130 includes a relieved or cut-away portion at one end of the element. The relieved portion is on the outer periphery of the element 130 and it includes a shoulder 132 and a relatively short cylindrical portion 134. The cylindrical portion 134 is, of course, axially extending.

The cylindrical tube element 140 includes a counterbore 142. The counterbore 142 includes a radially extending shoulder 144. A sealing element or gasket 146 is shown disposed within the counterbore 142 and against the shoulder 144, of the tube 140. The flange 124 of the thermostat 122 is in turn disposed against the sealing element 146. The cylindrical tube 130 is assembled to the cylindrical element 140 by the insertion of the relatively short cylindrical portion 134 in the counterbore 142. The inner and outer diameters of the short cylindrical portion and the counterbore, respectively, are substantially identical. The end of the cylindrical portion 134 is disposed against the flange 124 to hold the thermostat 122 against the sealing element 146. The two tubular elements 130 and 140 are then appropriately secured together to define a unitary thermostat element 120 having a continuous outer periphery and thus a constant diameter.

Any appropriate method may be used to secure the two tubular elements together. An internal weld 136 is shown. The weld 136 may be the result of solvent welding, or the like. Obviously, any appropriate process may be used to secure the tubular elements together.

It will be noted that the thermostat apparatus 120 does not include a radially outwardly extending flange extending outwardly beyond the outer periphery of the tubular elements 130 and 140. Obviously, if desired, an outwardly extending flange, such as shown in FIG. 8 and in FIGS. 3, 4, 5, 6, and 7, may be included.

FIG. 10 is a view in partial section of another alternate embodiment of the apparatus of the present invention. The apparatus shown in FIG. 10 is a cylindrical tube 160 without a thermostat, but with a sealing element or gasket 174 and a lock ring 176. The sealing element or gasket 174 and the lock ring 176 are shown spaced apart from the cylindrical tube 160. For convenience of illustration, a thermostat is not shown in FIGS. 10 and 11. It will be understood that a typical thermostat, as illustrated in the other Figures, will be used.

The cylindrical tube 160 includes a first cylindrical portion 162 and a second cylindrical portion 168. The first and second cylindrical portions 162 and 168 are separated by an outwardly extending flange 166. The first cylindrical portion 162 includes a first internal bore 164. Within the second cylindrical portion 168 is a counterbore 170. A radially extending shoulder 172 is disposed between the first bore 164 and the counterbore 170.

The sealing element or gasket 174 is adapted to be disposed on the shoulder 172 of the counterbore 170. In turn, a radially extending flange of a thermostat element, such as the elements 12, 32, 52, 82, or 122, may be disposed against the sealing element 174.

For securing the thermostat element within the tube 160, the lock ring 176 is used. The outer diameter of the lock ring 176 is substantially the same as the inner diameter of the counterbore 170. The lock ring 176 includes an internal bore 178 which is substantially the same diameter as that of the bore 164.

The lock ring 176 may be secured to the second cylindrical portion 168 by any appropriate method, such as solvent welding, or the like. When the lock ring 176 is secured within the counterbore 170, and against a thermostat, the assembled apparatus will defined, a unitary thermostatic apparatus consisting of a thermostat sealed in a housing.

The cylindrical tube element 160 includes the radially outwardly extending flange 166 which may be conveniently used as a stop element, such as the radially outwardly extending flanges 34, 62, and 102, of FIGS. 3-6, 7, and 8, respectively. Obviously, if desired the flange 166 may be omitted, as with the embodiments of FIGS. 1, 2, and 9. The flange 166 preferably has the same overall diameter as the radiator hoses which will be secured to the apparatus 160, thus defining a generally continuous cylindrical housing, and a generally continuous outer diameter with the hoses secured to the apparatus 160.

FIG. 11 is a side view in partial section of another alternate thermostat apparatus which includes a cylindrical tube 190. The tube 190 includes a first cylindrical portion 192 and a second cylindrical portion 198 separated by a radially outwardly extending flange 196. Within the first cylindrical portion 192 is a firstbore 194, and within the second cylindrical portion 198 is a counterbore 200. The counterbore 200 includes a radially extending shoulder 202 which divides the counterbore 200 from the first bore 194.

The flange 196 is substantially the same as the other flanges discussed above. It defines or comprises a convenient stop element for the radiator hoses to which the apparatus 190 will be secured.

A gasket 204 is shown spaced apart from the cylindrical tube 190. The gasket or sealing element 204 is adapted to be disposed on the shoulder 202 of the counterbore 200. In turn, a radially outwardly extending flange of a thermostat element (not shown), substantially identical to those discussed above, is adapted to be disposed on or against the sealing element 204, with the body of the thermostat disposed within the bore 194 and the counterbore 200.

Within the counterbore 200 is a circumferentially extending groove 206. The groove 206 cooperates with a spring type lock ring 208 to hold the thermostat element against the sealing element or gasket 204 and within the counterbore 200 and thus within the cylindrical tube 190. The lock ring 208 is designed to extend into the groove 208 and the outer periphery of the lock ring 208 accordingly matingly engages the groove 206. The lock ring 208 may be secured within the groove 206 by any appropriate sealing process, such as solvent welding, or otherwise.

The outwardly extending flange 196 of the tube 190 again, as discussed above in conjunction with the other similar elements in the other embodiments, provides a convenient stop element for radiator hoses. With the hoses secured to the apparatus 190, a continuous constant diameter combination of hoses and thermostat apparatus is provided. In the alternative, of course, as also discussed above, it may be omitted if desired.

In usage, each of the different embodiments of thermostat apparatus discussed herein comprises a single in-line element to which ends of radiator hoses or hose portions may be secured. If, or when, the thermostat element becomes inoperative for any reason, such as when the element sticks either open or closed, the hose clamps, such as the hose clamps 72 and 76, discussed above in conjunction with FIGS. 5, 6, and 7, may be loosened, and the ends of the radiator hoses may then be removed from the cylindrical portions of the thermostat apparatus. The unitary thermostat apparatus may then be easily removed and discarded and a new one inserted into the ends of the radiator hoses. The hose clamps are then tightened to sealingly secure the radiator hoses to the tubular portions of the thermostat apparatus. The in-line thermostat apparatus is thus conveniently, easily, and rapidly removed from and inserted into the radiator hoses.

In the embodiments of FIGS. 1-11, the diameter of the assembled apparatus has been substantially constant, defining a substantially cylindrical unit which includes a thermostat and a housing for the thermostat. The outer ends of the housing are connected directly to radiator hoses. However, the embodiments all include generally cylindrical housing portions, of substantially the same diameter, and such housings will therefore receive only hoses of specific inside diameters. That is, each apparatus unit is designed for hoses of limited diameter variations.

Figure 12:
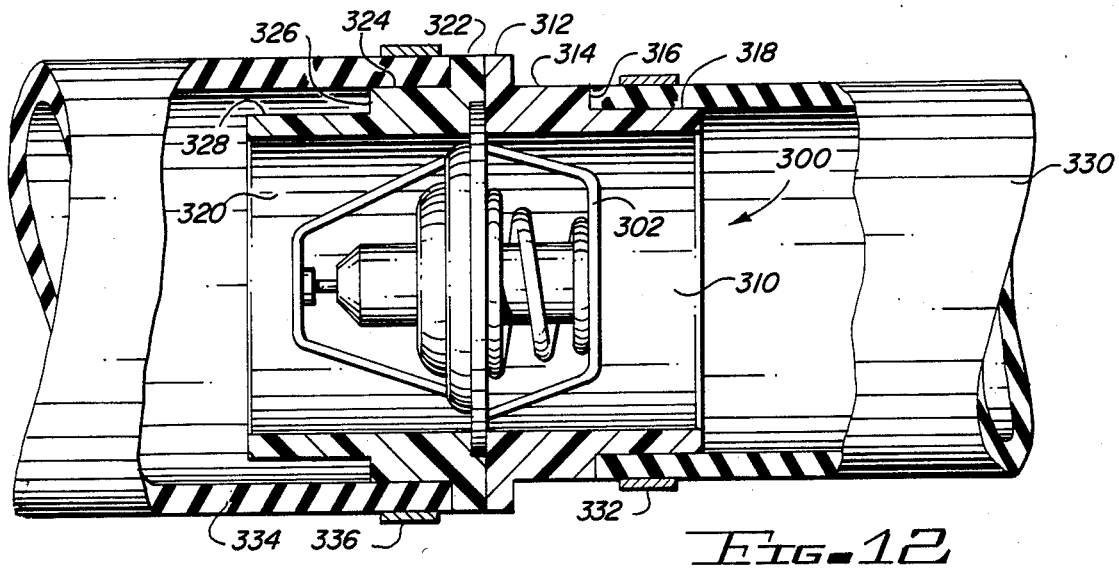
FIG. 12 is a view in partial section of another alternate embodiment of the apparatus of the present invention.
Figure 13:
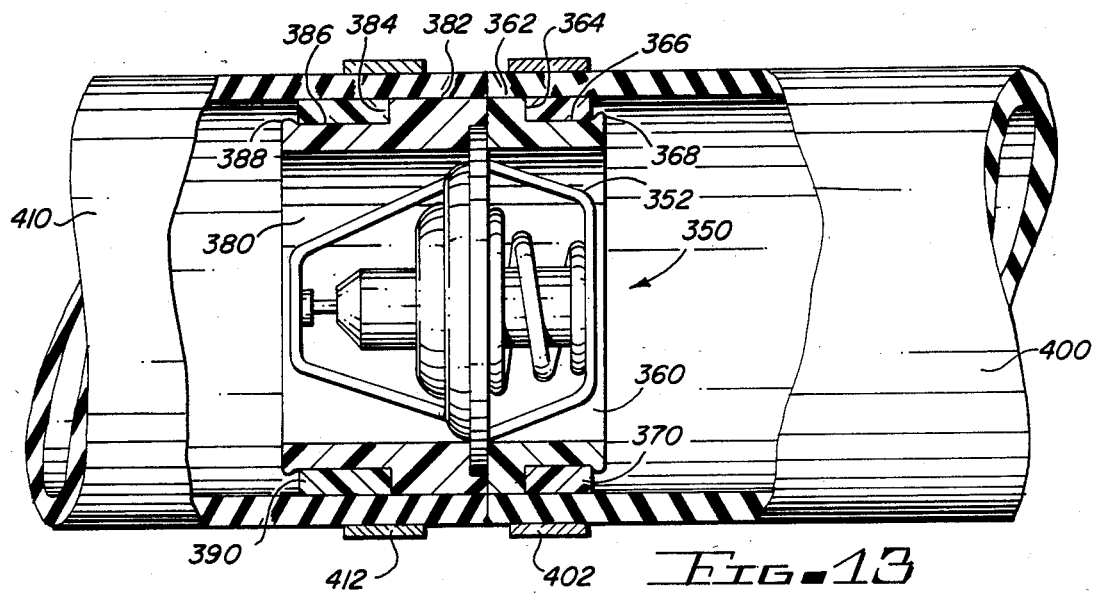
FIG. 13 is a view in partial section of the apparatus of FIG. 12 illustrating an alternate use of the apparatus of FIG. 12.

There are many thermostats in contemporary usage, with the overall diameter of the thermostats varying from design to design. Each of the various designs of thermostats generally are multiplied by three, due to the three general temperature ranges for which thermostats are made. The making and stocking of various thermostats accordingly becomes a substantial problem. In addition to the various different sizes (and temperature ranges) of thermostats, the radiator hoses also come in varying diameters. Obviously, in the embodiments of FIGS. 1-11, each thermostat apparatus is designed to fit hoses of limited diameter variations. In the embodiments of FIGS. 12 and 13, a single thermostat apparatus will fit at least two different sizes of hoses, thus alleviating the problem of requiring a manufacturer to make and a wholesaler and/or dealer to stock numerous sizes of thermostats. A single thermostat apparatus may be used in a number of applications which require different sized hoses.

FIG. 12 is a view in partial section of another alternate embodiment of the apparatus of the present invention. Integral thermostat apparatus 300 is shown in partial section in FIG. 12. Two different diameter radiator hoses are illustratively shown in FIG. 12 secured to the thermostat apparatus 300.

The integral, in-line thermostat apparatus 300 includes a thermostat 302 secured to a pair of cylindrical tubular elements 310 and 320. The cylindrical tubular elements 310 and 320 comprise a housing for the thermostat 302, and together the thermostat 302 and the tubular elements 310 and 320 define an integral, in-line thermostat apparatus which may be easily inserted between a pair of radiator hoses and which may be discarded when the thermostat 302 ceases to function or malfunctions for some reason.

The cylindrical tube 310 includes a radially outwardly extending flange 312 which may act as a stop element for a hose, and which also acts as a rim to which the tubular element 320 may be secured. The cylindrical flange 310 also includes two different outer diameter portions, including a first outer diameter portion or step 314 and a second outer diameter portion or step 318. The outer diameter portion 314 is disposed adjacent to the flange 312. A shoulder 316 extends between the steps 314 and 318.

The second outer diameter portion or step 318 is remote from the flange 312, and its outer diameter is less than that of the outer diameter portion or step 314. The steps 314 and 318 are both cylindrical in configuration, and are designed to receive hoses of two different inner diameters. A hose 330 is illustratively shown disposed on the second outer diameter portion 318 and secured by a hose clamp 332.

The cylindrical tubular member 320 is substantially identical to the cylindrical tubular member 310. It includes a radially outwardly extending flange 322, which is substantially identical to the outwardly extending flange 312 of the tubular member 310. The flanges 312 and 322 are disposed against each other and are appropriately secured together, as by solvent welding, etc. The radially outwardly extending flange of the thermostat 302 is disposed between the two flanges 312 and 322, preferably in a recess in one or both of the flanges 312 or 322. A gasket or some type of sealing element (not shown) may be required with the thermostat 302 and the tubular members 310 and 320.

The tubular member 320 also includes two different outer diameter portions or steps, a first outer diameter portion or step 324 and a second outer diameter portion or step 328. A shoulder 326 is disposed between the steps or outer diameter portions 324 and 328. The step 324 extends between the flange 322 and the shoulder 326. The overall outer diameter of the first portion or step 324 is greater than the outer diameter of the step 328.

The outer diameter of the steps 314 and 324 are substantially the same, as are the outer diameters of the steps 318 and 328.

A radiator hose 334 is shown secured to the largest diameter step 324 of the cylindrical tubular member 320. It will be noted that the inner diameter of the hose 334 is greater than that of the hose 330. Obviously, for a thermostat apparatus in actual use, the radiator hoses connected to it would be of the same inner diameter. However, for illustrative purposes, hoses of two different diameters are shown secured to the thermostat apparatus 300. The hose 330, which has a lesser inner diameter than the hose 334, is shown secured to the second step 318, which is the lesser outer diameter portion of the tubular member 310. The hose 334 is shown secured to the first step 324, which is the larger outer diameter portion of the tubular member 320, by a hose clamp 336. It is thus illustrated in FIG. 12 that a singular thermostat apparatus 300 may be secured to radiator hoses of different diameters. Accordingly, a single thermostat apparatus 300 will be able to fit several applications, or vehicles with different diameter radiator hose requirements. If desired, by adding a third step to the apparatus 300, a third size of radiator hose could also be accommodated.

In FIG. 12, it will be noted that the outer diameter portions which receive the radiator hoses extend axially for a length sufficient to allow a hose clamp to securely fasten the radiator hoses to the thermostat apparatus. If a minimum overall length of a thermostat apparatus is of paramount importance, the overall length of the thermostat apparatus may be decreased while still retaining the concept of the dual outer diameter portion to accommodate different sized hoses. This is illustrated in FIG. 13.

FIG. 13 is a view in partial section of another alternate embodiment of the apparatus of the present invention. A thermostat apparatus 350 is shown in FIG. 13. It will be noted that the axial length of the thermostat apparatus 350 in FIG. 13 is substantially less than the axial length of the thermostat apparatus 300 of FIG. 12. Yet, the alternate embodiment apparatus 350 still includes two different outer diameter portions which may receive, and thus accommodate, radiator hoses of different diameters.

The in-line thermostat apparatus 350 of FIG. 13 includes a thermostat 352 secured to a pair of cylindrical tubular housing elements 360 and 380. In the in-line thermostat apparatus 350, neither of the cylindrical tubular portions 360 or 380 includes an outwardly extending flange. Rather, the exterior or outwardly extending flanges have been omitted in order to increase the overall length of the thermostat apparatus 350 to be able to receive radiator hose portions.

The cylindrical tubular member 360 includes a first step or outer diameter portion 362 and a second step or outer diameter portion 366. A shoulder 364 extends between the portions 362 and 366. It will be noted that the first step or outer diameter portion 362 is axially of a length substantially less than the axial length of the second step or outer diameter portion 366. The axial length of the first portion 362 is less than the required length for securing a radiator hose, such as a radiator hose 400, to thermostat apparatus 350. Accordingly, a ring 370 is disposed on the second step or outer diameter portion 366 to extend the overall axial length of the first step 362.

To help hold the ring 370 securely in place on the second portion 366, the second portion 366 includes a relatively short upwardly extending lip 368. The lip 368 is remote from the shoulder 364, and is disposed at the end of the second step 366, and thus at the outer or distal end of the cylindrical tubular member 360, remote from the cylindrical tubular member 380.

The hose 400 is shown disposed on the first step 362 and on the outer periphery of the ring 370. The hose 400 is held in place on the cylindrical tubular member 360 of the thermostat apparatus 350 by a hose clamp 402.

If it is desired to use the thermostat 350 with a radiator hose of a lesser inner diameter than the hose 400, the ring 370 is not required. Rather, the lesser diameter hose is simply disposed on the second step 366. The axial length of the second portion 366 is sufficient to allow a hose to be secured thereon by a conventional hose clamp.

The cylindrical tubular member 380 of the thermostat apparatus 350 is shown in FIG. 13 as being of a somewhat greater axial length than the tubular member or portion 360. The overall length of the tubular member or portion 380 may be the same as that of the tubular portion 360, if desired, or it may be longer, as shown, so that the thermostat 350 is disposed entirely within the tubular portions or housing members 360 and 380.

Depending on the overall length of the tubular portion 380, a ring 390 may or may not be required. The ring 390 is substantially the same as the ring 370.

The tubular member 380 includes a first step or outer diameter portion 382 and a second step or outer diameter portion 386, with a shoulder 384 extending between the two steps. As indicated above, the cylindrical tubular member 380 does not include a radially outwardly extending flange against which the radiator hoses 400 and 410 may be disposed.

The overall axial length of the first step or outer diameter portion 382 is somewhat less than that generally required for securing a radiator hose 410 thereon. Accordingly, the ring 390 is shown disposed on the second step 386. A lip 388 at the rear end of the second step 386 is used to help hold the ring 390 in place.

The ring 390 is substantially the same as the ring 370 in that its overall axial length extends between the shoulder 384 and the lip 388. The outer diameter of the ring 390 is substantially the same as the outer diameter of the first step 382, and the inner diameter of the ring 390 is substantially the same as the outer diameter of the second step 386. Thus, when the ring 390 is in place on the second step 386, its outer periphery comprises a continuation of the outer periphery of the first step or outer diameter portion 382.

With the hose 410 disposed on the outer periphery of the first portion 382 and on the outer periphery of the ring 390, the hose 410 is secured in place by a hose clamp 412.

If the hose 410 is of a lesser diameter, such that it may be disposed on the periphery of the second step or outer diameter portion 386, there obviously is no need for the ring 390. The ring 390 may then be removed, or need not be installed, whichever the case may be.

With the apparatus of the present invention, it will be seen that a single in-line, disposable thermostat apparatus may be used in a number of applications, such that a single unit may be used in several different vehicles, each with its own dimensions, both in terms of distance between an engine block and a radiator, and in terms of diameter of a radiator hose. As has been stated above, the in-line thermostat apparatus obviates the need for the removal of a thermostat housing on an engine block. The convenience of a single thermostat apparatus usable with many different vehicles simplifies the manufacture of thermostats and simplifies the marketing of thermostats. And, as has also been stated, the overall substantially constant diameter cylindrical configuration of the thermostat apparatus aids in the prevention of additional clutter in an engine compartment and does not interfere with any existing wiring, hoses, etc.

Finally, the unitary in-line thermostat apparatus obviously makes the replacement of a thermostat a much simpler operation in that two hose clamps are simply loosened, the old unit removed from the radiator hoses, and the new unit reinstalled in the radiator hoses, and the clamps are then retightened. The simplification of the thermostat removal and installation process saves substantial man hours, particularly in contemporary vehicles in which the removal of the thermostat housing in an engine block can be an extremely time-consuming project.

Referring again to FIG. 8, and to the threaded connection of the cylindrical or tubular housing portions 90 and 100, it will be noted that the threaded connection there illustrated may also be used in the other embodiments illustrated herein. Even with a threaded connection between the tubular elements, thus providing a serviceable thermostat apparatus, the concept of a unitary, in-line apparatus is still maintained. The housing portions for the thermostatic elements still define substantially constant diameter in-line units.

By using plastic or similar material for the housing, the lower overall cost makes a throw-away unit a practical reality. The ease and simplicity of replacing a thermostatic unit between the radiator and the engine block has substantial benefits over contemporary situations where the thermostat is located in a housing on an engine block. This is particularly so when the complexity of contemporary engine compartments is considered, along with the problems of rust, gaskets, etc., at the housing and block.

While the principles of the invention have been made clear in illustrative embodiments, there will be immediately obvious to those skilled in the art many modifications of structure, arrangement, proportions, the elements, materials, and components used in the practice of the invention and otherwise, which are particularly adapted for specific environments and operative requirements without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What is claimed is:

1. Unitary thermostat apparatus for in-line installation in a radiator hose between a radiator and an engine, comprising, in combination:
   a thermostat having a radially outwardly extending flange; and
   cylinder means having a substantially constant diameter secured to the radially outwardly extending flange of the thermostat and including
      a first cylindrical portion adapted to be secured to a first radiator hose portion,
      a second cylindrical portion adapted to be secured to a second radiator hose portion, whereby the unitary thermostat apparatus may be inserted into and removed from the radiator hose, and
      step means having different diameters for receiving hose portions of different diameters.

2. The apparatus of claim 1 in which the step means includes a first step and a second step, and the diameter of the first step is greater than the diameter of the second step.

3. The apparatus of claim 2 in which the step means further includes a ring disposed on the second step and having an outer diameter substantially the same as that of the first step and comprising an axial extension of the first step.

4. The apparatus of claim 1 in which the cylinder means further includes a radially outwardly extending flange comprising a stop element for the radiator hose portions.

* * * * *